United States Patent [19]
Ozer

[11] Patent Number: 5,227,262
[45] Date of Patent: Jul. 13, 1993

[54] UNIVERSAL CAMCORDER BATTERY PACK

[76] Inventor: Yaacov Ozer, 2nd Floor, Cambridge House, 5 Minden Ave., Tsimshatushu, Kowloon, Hong Kong

[21] Appl. No.: 910,486

[22] Filed: Jul. 8, 1992

[51] Int. Cl.⁵ ............................................. H01M 2/10
[52] U.S. Cl. .................................... 429/98; 429/123; 429/90
[58] Field of Search .................. 429/96–100, 429/121, 123, 90; 307/150

[56] References Cited
U.S. PATENT DOCUMENTS

| | | | |
|---|---|---|---|
| 4,829,224 | 5/1989 | Gandelman et al. | 429/99 X |
| 4,992,987 | 2/1991 | Echols et al. | 429/96 X |
| 5,122,927 | 6/1992 | Satou | 429/99 X |
| 5,149,603 | 9/1992 | Fleming et al. | 429/98 |
| 5,180,644 | 1/1993 | Bresin et al. | 429/98 |

Primary Examiner—Anthony Skapars
Attorney, Agent, or Firm—Spensley, Horn, Jubas & Lubitz

[57] ABSTRACT

A universal camcorder battery pack for use with a number of different camcorder makes and models, including those most popular in the camcorder industry. Such a universal camcorder battery pack provides for both mechanical and electrical compatibility between the battery pack and standard footprints for the leading manufacturers of camcorders.

20 Claims, 3 Drawing Sheets

UNIVERSAL CAMCORDER BATTERY PACK

FIELD OF THE INVENTION

The present invention is directed to a universal camcorder battery pack for use with numerous commercially available camcorders. More particularly, the present invention is directed to a universal camcorder battery pack which is compatible with the four leading standards for camcorder batteries.

BACKGROUND OF THE INVENTION

Prior art camcorder battery packs are generally limited to use with a single brand of camcorder, or at most accommodate the base configurations of two brands of camcorders. Since camcorder battery packs can be expensive, the purchaser of a camcorder battery pack must be quite certain as to the manufacturer of the camcorder for which the battery pack is being purchased.

As the use of camcorders has proliferated, the footprint or base configuration of camcorder battery packs have tended to fall within one of four standard configurations. The footprints of the Hitachi, Panasonic, Sony and Sharp "Twin Cam" camcorder battery packs have become the "de facto" standards for the camcorder industry. For example, since Sony manufactures Ricoh camcorders, a Sony camcorder battery pack will fit a Ricoh camcorder. In order to properly function in a camcorder, the camcorder battery pack must have both mechanical and electrical compatibility with the camcorder in which it is used.

As the base configuration of camcorder battery packs generally falls along one of the above-discussed four standard configurations, suppliers of battery packs are still required to produce battery packs having footprints which fit each of the four standard configurations. The production of four separate camcorder battery pack models requires four different manufacturing procedures as well as separate mechanical and electrical components for each of the four models of battery packs. While camcorder battery packs which accommodate two of the four standard base configurations are available, a camcorder battery pack which accommodates the four major standard base configurations has not been known.

In addition to the difficulties of manufacturing four different camcorder battery packs having four separate base configurations, a purchaser of a camcorder battery pack must be aware of the precise base configuration needed in order to select the correct camcorder battery pack. If the purchaser of the camcorder battery pack is not the owner of the camcorder in which the battery pack will be used, (e.g., the battery pack is being purchased as a gift) this can create difficulty in selecting the appropriate battery pack.

Even more importantly, retailers must stock multiple battery pack types resulting in extraordinary inventory and floor space requirements and substantial increases in carrying costs.

SUMMARY OF THE INVENTION

Accordingly, it is an object of the present invention to solve the above-mentioned difficulties associated with prior art camcorder battery packs and to produce a universal camcorder battery pack that can be suitably used in at least three, and preferably in each of the four standard base configurations without modification.

In addition, it is a more specific object of the present invention to provide a universal camcorder battery pack that provides for mechanical and electrical compatibility with each of the four standard base configurations discussed above.

These and other objects of the present invention will become clear from the detailed discussion below when taken into consideration with the drawings. It is to be understood that the following discussion is intended merely to illustrate the preferred embodiment of the present invention. However, the present invention is not limited to the illustrated embodiments, but is limited solely by the claims appended to this specification.

DESCRIPTION OF THE PREFERRED EMBODIMENT

Figure 1:
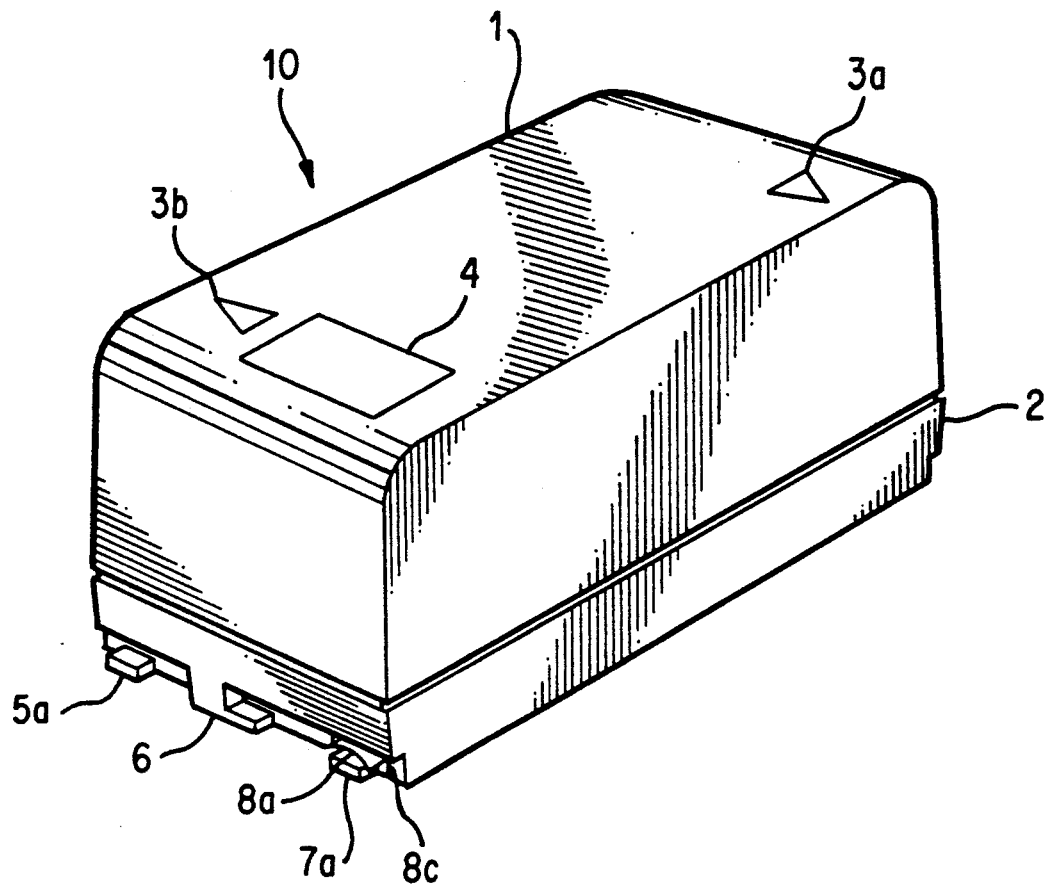
FIG. 1 is a plan view of the universal camcorder battery pack in accordance with an embodiment of the present invention.

FIG. 1 illustrates a preferred embodiment of the universal camcorder battery pack in accordance with the present invention. It is to be understood that the illustrations are not to be considered in a limiting sense, but are merely provided to illustrate a preferred embodiment of the invention. The invention is best defined by the claims appended to this description.

As can be seen in FIG. 1, a universal camcorder battery pack in accordance with one embodiment of the present invention includes upper and lower casings 1, 2. The upper and lower casings 1, 2 serve to contain rechargeable battery cells (not shown) which supply power to the camcorder (not shown) through contacts located in the base and end portions of the battery pack 10. The contacts will be discussed in more detail below. Disposed on an upper surface of the upper casing 1 are arrows 3a and 3b which are used to direct a user as to the proper placement of the universal camcorder battery pack 10 based on the type of camcorder for which it will be used. The arrows 3a and 3b provide alignment assistance depending on the type of camcorder. For example, arrow 3a could be utilized to direct a user when the camcorder battery pack 10 is being utilized with Sony, Sharp or Hitachi brand camcorders. Similarly, the arrow 3b can be utilized to direct a user of the camcorder battery pack 10 in association with Panasonic brand camcorders.

The universal camcorder battery pack 10 can include a display 4 to provide the user with an indication of remaining battery life. The display 4 can be any suitable form of display, including a liquid crystal display (LCD), a light emitting diode display (LED) or any other suitable display technology. The ability to provide an indication of the remaining battery life is well-known to those skilled in the art.

Figure 4A:
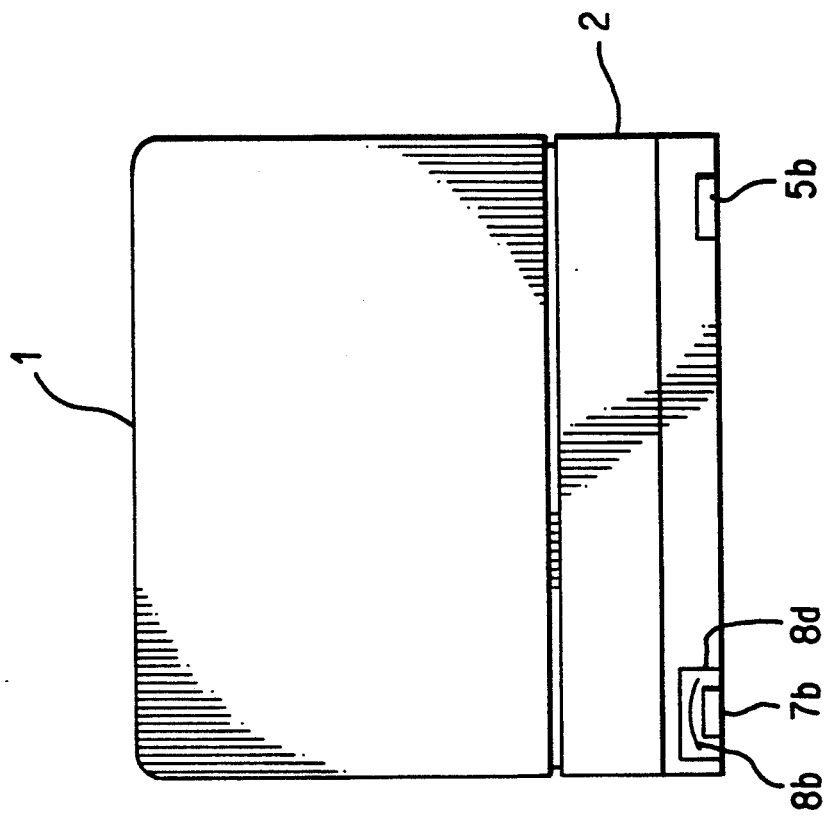
FIGS. 4a and 4b are end views of the universal camcorder battery pack illustrated in FIG. 1.
Figure 4B:
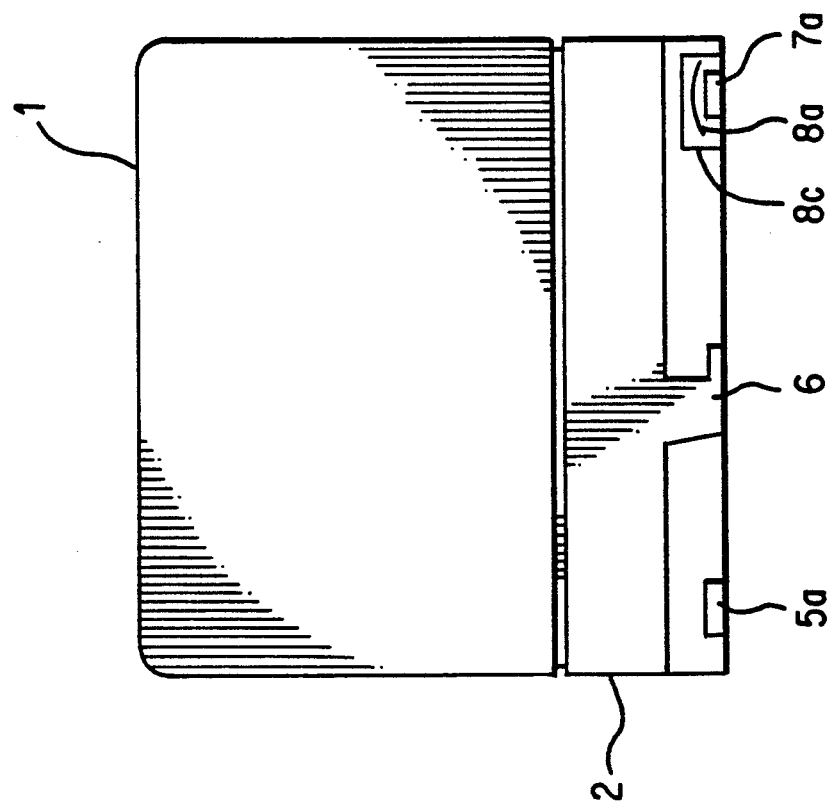

As can be seen in FIG. 1, and in more detail in FIGS. 4a and 4b, the camcorder battery pack 10 is provided with connecting members at respective ends of the battery pack 10. Connecting members 5a, 5b and 6 are utilized to interconnect with corresponding connecting member receptacles on the camcorder with which the battery pack 10 is used. The connecting members 5a, 5b, 6 assist in holding the battery pack 10 in place on the camcorder.

For certain types of camcorders, e.g., Hitachi brand camcorders and those which conform to the Hitachi connection standard, electrical connections are disposed on the ends of the battery pack 10. Referring to FIGS. 4a and 4b, the battery pack 10 is provided with protruding members 7a and 7b, with electrical contacts 8a and 8b being disposed above the protruding members 7a and 7b, respectively. The electrical contacts 8a and 8b also protrude from the body of the battery pack 10 approximately the same amount as the protruding members 7a and 7b and provide for the power supply to the camcorder. The electrical contacts 8a and 8b protrude from openings 8c and 8d, respectively, on the respective ends of the camcorder 10.

Figure 2:
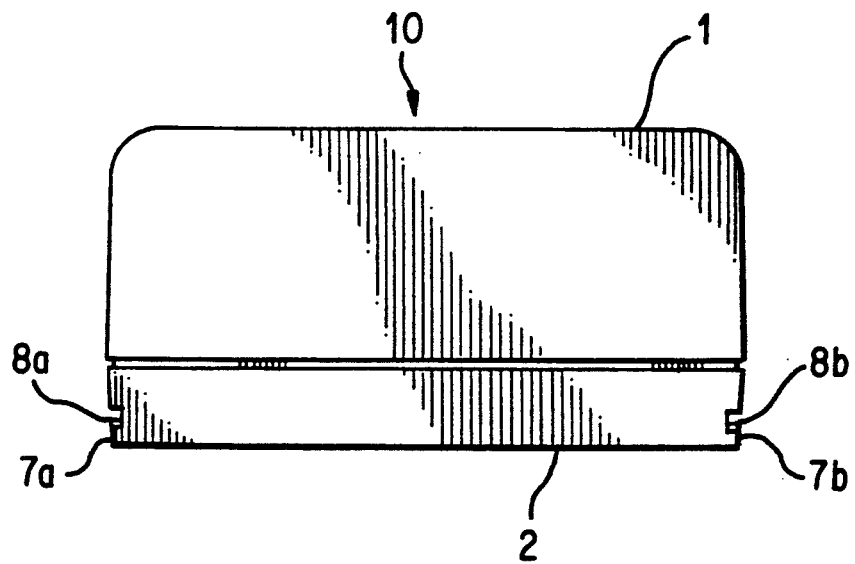
FIG. 2 is a side view of the universal camcorder battery pack shown in FIG. 1.

FIG. 2 provides a side view of the camcorder battery pack 10 illustrated in FIG. 1. As can be seen in FIG. 2, the protruding members 7a and 7b, in conjunction with the electrical contacts 8a and 8b, extend from the end of the battery pack 10 for interconnection with corresponding receptacles on the camcorder. In addition to providing electrical power to the camcorder, the protruding members 7a, 7b can assist in securing the camcorder battery pack 10 in place.

Figure 3:
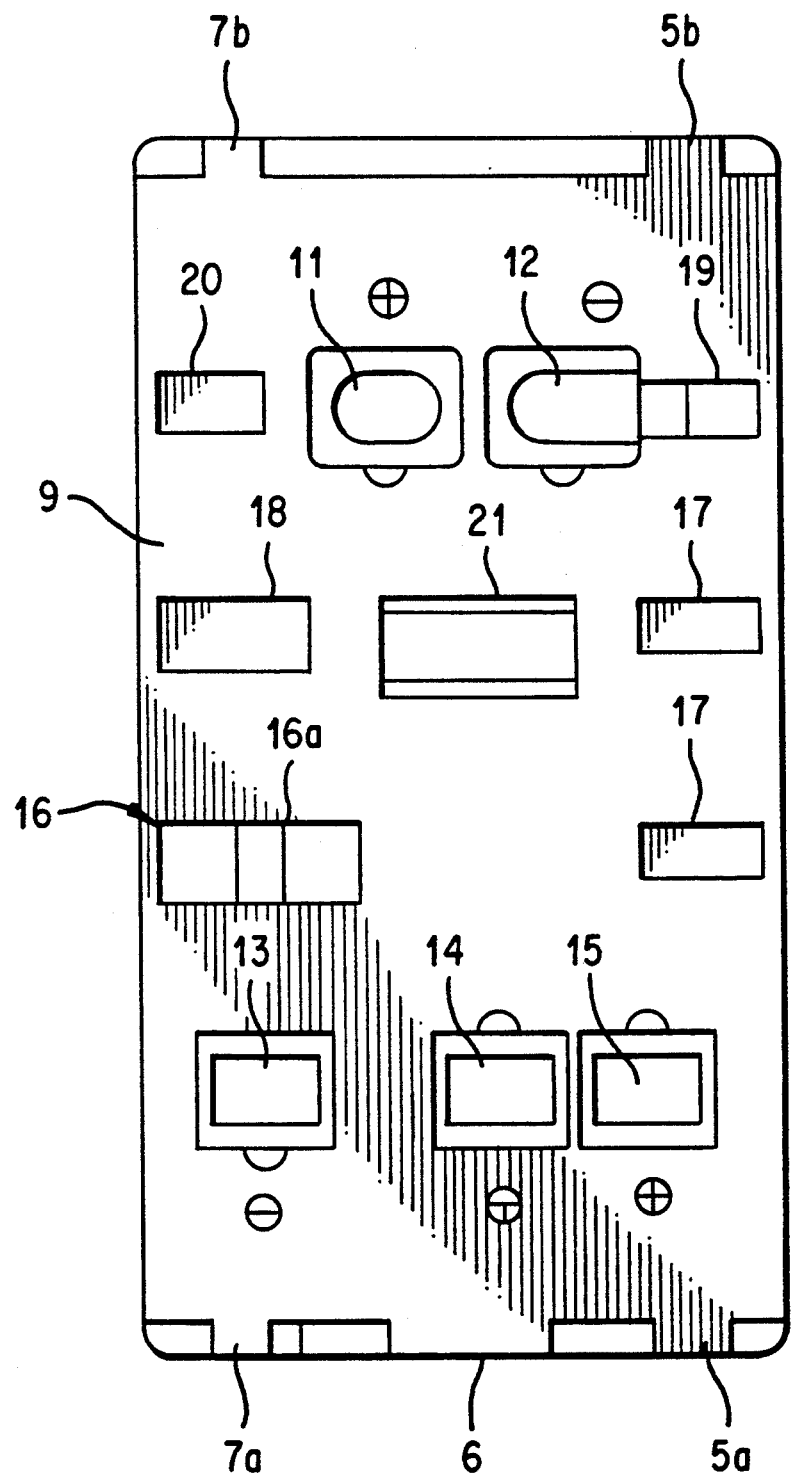
FIG. 3 is a bottom view of the universal camcorder battery pack illustrated in FIG. 1.

FIG. 3 provides a bottom view of the camcorder battery pack 10. The bottom 9 of the battery pack 10 includes a plurality of indentations which are provided to accommodate various projections on the different brands of camcorders for which the battery pack 10 is to be used. Thus, reference numerals 17, 18, 19, 20 and 21 illustrate indentations in the bottom 9 of the camcorder battery pack 10. The mating of the projections with the indentations assists to secure the battery pack 10 in place on the camcorder. In addition to the projection/indentation mating, a locking mechanism 16 which includes an indentation and a spring loaded locking latch 16a is disposed on the bottom 9 of the battery pack 10. The locking mechanism 16 serves to secure the battery pack 10 in place in a manner well known in the art.

The electrical contacts which supply power to the various camcorder models are illustrated as reference numerals 11, 12, 13 and 15. The positive and negative electrical contacts 11 and 12, which are also identified with "+" and "−" symbols, respectively, have hybrid configurations for utilization with camcorders conforming to both the Sony and Sharp standards for electrical connections. The positive and negative electrical contacts 13 and 15, which are also identified with "−" and "+" symbols, respectively, can be utilized for camcorders which follow the Panasonic standard for electrical connections. Reference numeral 14 refers to a temperature/charge sensor terminal "T" which is utilized by Panasonic camcorders. The temperature/charge sensor terminal 14 allows the camcorder to sense the temperature/charge of the battery pack in order to determine if a battery pack is over/under charged. With respect to camcorders which follow the Hitachi standard for electrical connections, as discussed above, such camcorders utilize the electrical connectors 8a and 8b illustrated in FIGS. 1, 2, 4a and 4b.

A universal camcorder battery pack having those features described above is capable of being used with the four major standard configurations for camcorder battery packs, i.e., Hitachi, Panasonic, Sony and Sharp "Twin Cam". As camcorder brands proliferate, the newer brand models generally follow one of the above-identified four standard connection configurations. Accordingly, a universal camcorder battery pack in accordance with the present invention is capable of being utilized with a majority of camcorders available on the market. Such a camcorder battery pack greatly eases retailer inventory burden as well as the burden on consumers of choosing the proper battery pack and assists manufacturers by requiring a single manufacturing facility and procedure to manufacture batteries which fit all the major brands of camcorders.

Although the present invention has been described in terms of a preferred embodiment above, numerous modifications and/or additions to the above-described preferred embodiment would be readily apparent to one skilled in the art. It is intended that the scope of the present invention extends to all such modifications and/or additions and that the scope of the present invention is limited solely by the claims set forth below.

What is claimed is:

1. A universal camcorder battery pack comprising:
   a housing including a top, a base opposite to the top, a first end and a second end opposite to the first end;
   at least one battery enclosed within the housing;
   a first plurality of contacts disposed in the base and connected to the at least one battery, the first plurality of contacts being adapted to be coupled to at least one standard set of camcorder contacts;
   a second plurality of contacts disposed in the base and connected to the at least one battery, the second plurality of contacts being adapted to be coupled to a second standard set of camcorder contacts;
   a third plurality of contacts including a first electrical contact connected to the at least one battery and projecting from the first end of the housing and a second electrical contact connected to the at least one battery and projecting from the second end of the housing, the first and second contacts being adapted to be coupled to a third standard set of camcorder contacts; and
   a locking device disposed in the base for locking the battery pack in place on a camcorder.

2. A universal camcorder battery pack, as defined in claim 1, wherein the first plurality of contacts comprises a first array of contacts disposed in the base adjacent the first end, and the second plurality of contacts comprises a second array of contacts disposed in the base adjacent the second end.

3. A universal camcorder battery pack, as defined in claim 2, wherein the first and second pluralities of contacts each include at least a positive electrical contact and a negative electrical contact.

4. A universal camcorder battery pack according to claim 3, wherein the second plurality of contacts includes a temperature sensor contact.

5. A universal camcorder battery pack according to claim 3, wherein the second plurality of contacts includes a charge sensor contact.

6. A universal camcorder battery pack as defined in claim 1, including
   contact alignment identifying means for identifying a proper alignment of the battery pack in accordance with at least one of the sets of standard camcorder contacts.

7. A universal camcorder battery pack as defined in claim 1, including battery life indicating means disposed in the housing for providing an indication of a state of charge of the at least one battery.

8. A universal camcorder battery pack comprising:
a generally rectangular housing including a top, a base opposite to and generally parallel with the top and generally parallel ends;
a plurality of batteries enclosed within the housing;
a first contact array disposed in the base including a row of contacts adjacent one end of the housing and extending parallel to the end, the contacts of the first array including at least one positive and at least one negative contact, the contacts of the first array being connected to the plurality of batteries and having outer surfaces adapted to be coupled to first and second standard sets of camcorder contacts;
a second contact array disposed in the base including a row of contacts adjacent the other end of the housing and extending parallel to the other end, the contacts of the second array including at least one positive and at least one negative contact, the contacts of the second array being connected to the plurality of batteries and having outer surfaces adapted to be coupled to a third standard set of camcorder contacts;
a third contact array connected to the plurality of batteries and including a positive contact projecting from one of the ends of the housing proximate the base, and a negative contact projecting from the other end of the housing proximate the base and in alignment with the positive contact, the contacts of the third array having surfaces adapted to be coupled to a fourth standard set of camcorder contacts; and
means in the base for locking the battery pack in place in a camcorder.

9. A universal camcorder battery pack, as defined in claim 8, which includes:
battery life indicating means disposed in the top of the battery pack housing.

10. A universal camcorder battery pack, as defined in claim 8, wherein at least the first contact array further includes a charge sensing contact.

11. A universal camcorder battery pack, as defined in claim 8, wherein at least the first contact array further includes a temperature sensing contact.

12. A universal camcorder battery pack as defined in claim 8, including
contact alignment identifying means for identifying a proper alignment of the battery pack in accordance with at least one of the first, second, third and fourth sets of standard camcorder contacts.

13. A universal battery pack comprising:
a housing including a top, a base opposite to the top, a first end and a second end opposite to the first end;
at least one battery enclosed within the housing;
a first plurality of contacts disposed in the base and connected to the at least one battery, the first plurality of contacts being adapted to be coupled to first and second standard sets of electrical contacts;
a second plurality of contacts disposed in the base and connected to the at least one battery, the second plurality of contacts being adapted to be coupled to a third standard set of electrical contacts;
a third plurality of contacts including a first electrical contact connected to the at least one battery and projecting from the first end of the housing and a second electrical contact connected to the at least one battery and projecting from the second end of the housing, the first and second contacts being adapted to be coupled to a fourth standard set of electrical contacts.

14. A universal battery pack, as defined in claim 13, wherein the first plurality of contacts comprises a first array of contacts disposed in the base adjacent the first end, and the second plurality of contacts comprises a second array of contacts disposed in the base adjacent the second end.

15. A universal battery pack, as defined in claim 14, wherein the first and second arrays of contacts each include at least a positive electrical contact and a negative electrical contact.

16. A universal battery pack according to claim 15, wherein the second array of contacts includes a temperature sensor contact.

17. A universal battery pack according to claim 15, wherein the second array of contacts includes a charge sensor contact.

18. A universal battery pack as defined in claim 1, including
contact alignment identifying means for identifying a proper alignment of the battery pack in accordance with at least one of the first, second, third and fourth sets of standard electrical contacts.

19. A universal battery pack as defined in claim 13, including battery life indicating means disposed in the housing for providing an indication of remaining life of the at least one battery.

20. A universal battery pack as defined in claim 13, including locking means for locking the battery pack to a device including at least one of the first, second, and third sets of standard electrical contacts.

* * * * *